US010684758B2

(12) United States Patent
Hinckley et al.

(10) Patent No.: US 10,684,758 B2
(45) Date of Patent: *Jun. 16, 2020

(54) UNIFIED SYSTEM FOR BIMANUAL INTERACTIONS

(71) Applicant: Microsoft Technology Licensing, LLC, Redmond, WA (US)

(72) Inventors: Kenneth P. Hinckley, Redmond, WA (US); Michel Pahud, Kirkland, WA (US); William Arthur Stewart Buxton, Toronto (CA); Haijun Xia, Toronto (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 121 days.

This patent is subject to a terminal disclaimer.

(21) Appl. No.: 15/437,352

(22) Filed: Feb. 20, 2017

(65) Prior Publication Data
US 2018/0239519 A1 Aug. 23, 2018

(51) Int. Cl.
*G06F 3/0484* (2013.01)
*G06F 3/0488* (2013.01)
*G06F 3/0482* (2013.01)
*G06F 3/0486* (2013.01)

(52) U.S. Cl.
CPC ........ *G06F 3/04845* (2013.01); *G06F 3/0482* (2013.01); *G06F 3/0486* (2013.01); *G06F 3/0488* (2013.01); *G06F 3/04883* (2013.01); *G06F 2203/04806* (2013.01); *G06F 2203/04808* (2013.01)

(58) Field of Classification Search
CPC ....................... G06F 2203/04808; G06F 3/017
See application file for complete search history.

(56) References Cited

U.S. PATENT DOCUMENTS

| 5,655,136 | A | 8/1997 | Morgan |
| 6,515,669 | B1 | 2/2003 | Mohri |
| 7,770,120 | B2 | 8/2010 | Baudisch |
| 8,289,316 | B1 | 10/2012 | Reisman et al. |

(Continued)

OTHER PUBLICATIONS

Visual Touchpad: A Two-handed Gestural Input Device by Shahzad Malik, ICMI 2004 (Year: 2004).*

(Continued)

*Primary Examiner* — William L Bashore
*Assistant Examiner* — Nathan K Shrewsbury

(57) ABSTRACT

The unified system for bimanual interactions provides a lightweight and integrated interface that allows the user to efficiently interact with and manipulate content in the user interface. The system is configured to detect a multi-finger interaction on the touchscreen and to differentiate whether the user intends to pan, zoom or frame a portion of the user interface. Generally, the framing interaction is identified by detection of the user's thumb and forefinger on the touchscreen, which cooperate to define a focus area between vectors extending outwards from the user's thumb and forefinger. Upon a determination that the user intends to interact with or manipulate content within the focus area, the unified system for bimanual interactions provides an indication of the objects that are located within the focus area and contextual menus for interacting with the objects.

20 Claims, 13 Drawing Sheets

(56) References Cited

U.S. PATENT DOCUMENTS

| | | | |
|---|---|---|---|
| 8,751,550 | B2 | 6/2014 | Vukosavljevic et al. |
| 8,890,889 | B1 | 11/2014 | Fleischer et al. |
| 8,971,572 | B1 | 3/2015 | Yin et al. |
| 9,063,575 | B2 | 6/2015 | Huie |
| 9,116,871 | B2 | 8/2015 | Isabel et al. |
| 9,239,673 | B2* | 1/2016 | Shaffer .................. G06F 3/038 |
| 9,311,528 | B2 | 4/2016 | Westerman |
| 9,348,458 | B2 | 5/2016 | Hotelling et al. |
| 9,354,780 | B2 | 5/2016 | Miyake et al. |
| 9,513,798 | B2 | 12/2016 | Helmes et al. |
| 9,652,042 | B2 | 5/2017 | Wilson et al. |
| 9,965,174 | B2 | 5/2018 | Herbordt et al. |
| 10,082,950 | B2 | 9/2018 | Lapp |
| 2005/0283804 | A1 | 12/2005 | Sakata et al. |
| 2006/0085767 | A1 | 4/2006 | Hinckley et al. |
| 2007/0065013 | A1 | 3/2007 | Saund et al. |
| 2007/0192749 | A1* | 8/2007 | Baudisch ............. G06F 3/0486 715/863 |
| 2008/0036743 | A1 | 2/2008 | Westerman et al. |
| 2008/0180404 | A1 | 7/2008 | Han et al. |
| 2008/0240570 | A1 | 10/2008 | Shi et al. |
| 2008/0260240 | A1 | 10/2008 | Vukosavljevic et al. |
| 2008/0297482 | A1* | 12/2008 | Weiss .................. G06F 3/04883 345/173 |
| 2009/0201168 | A1 | 8/2009 | Liu et al. |
| 2010/0050134 | A1 | 2/2010 | Clarkson |
| 2010/0253620 | A1 | 10/2010 | Singhal |
| 2010/0283750 | A1* | 11/2010 | Kang .................. G06F 3/0416 345/173 |
| 2011/0069018 | A1* | 3/2011 | Atkins .................. G06F 3/0416 345/173 |
| 2011/0163956 | A1 | 7/2011 | Zdralek |
| 2011/0181524 | A1 | 7/2011 | Hinckley et al. |
| 2011/0185299 | A1 | 7/2011 | Hinckley et al. |
| 2011/0185300 | A1 | 7/2011 | Hinckley et al. |
| 2011/0185320 | A1 | 7/2011 | Hinckley et al. |
| 2011/0191704 | A1 | 8/2011 | Hinckley et al. |
| 2011/0191718 | A1 | 8/2011 | Hinckley et al. |
| 2011/0191719 | A1 | 8/2011 | Hinckley et al. |
| 2011/0291945 | A1 | 12/2011 | Ewing, et al. |
| 2011/0307535 | A1 | 12/2011 | Vukosavljevic et al. |
| 2012/0131516 | A1* | 5/2012 | Chiu .................. G06F 3/04883 715/863 |
| 2012/0154295 | A1 | 6/2012 | Hinckley et al. |
| 2012/0169623 | A1* | 7/2012 | Grossman ............. G06F 3/0416 345/173 |
| 2012/0236026 | A1 | 9/2012 | Hinckley et al. |
| 2013/0033448 | A1 | 2/2013 | Yano et al. |
| 2013/0038555 | A1* | 2/2013 | Maeda .................. G06F 3/04883 345/173 |
| 2013/0139079 | A1 | 5/2013 | Kitao et al. |
| 2013/0145327 | A1 | 6/2013 | Rinearson et al. |
| 2013/0167084 | A1* | 6/2013 | Miyake .................. G06F 3/0482 715/810 |
| 2013/0265222 | A1 | 10/2013 | Berenson et al. |
| 2013/0290911 | A1* | 10/2013 | Praphul .................. G06F 3/017 715/863 |
| 2014/0149928 | A1* | 5/2014 | Freyhult ............. G06F 3/04883 715/798 |
| 2014/0160054 | A1 | 6/2014 | Rabii et al. |
| 2014/0215393 | A1 | 7/2014 | Schwartz et al. |
| 2014/0225836 | A1 | 8/2014 | Avison-fell et al. |
| 2014/0257532 | A1 | 9/2014 | Kim et al. |
| 2014/0365978 | A1* | 12/2014 | Fish .................. G06F 3/017 715/863 |
| 2015/0123890 | A1 | 5/2015 | Kapur et al. |
| 2015/0123891 | A1 | 5/2015 | Tu et al. |
| 2015/0244911 | A1* | 8/2015 | Xie ...................... H04N 5/2258 348/207.11 |
| 2015/0293600 | A1 | 10/2015 | Sears |
| 2015/0316981 | A1 | 11/2015 | Sellen et al. |
| 2016/0187991 | A1* | 6/2016 | Hung .................. G06F 3/017 345/156 |
| 2016/0252968 | A1 | 9/2016 | Noble |
| 2017/0010695 | A1 | 1/2017 | Pahud et al. |
| 2017/0010733 | A1 | 1/2017 | Pahud et al. |
| 2017/0090666 | A1 | 3/2017 | Pahud et al. |
| 2017/0168586 | A1 | 6/2017 | Sinha et al. |
| 2017/0177203 | A1 | 6/2017 | Davidov et al. |
| 2017/0277367 | A1 | 9/2017 | Pahud et al. |
| 2018/0239520 | A1 | 8/2018 | Hinckley et al. |

OTHER PUBLICATIONS

Brandl, et al., "Combining and Measuring the Benefits of Bimanual Pen and Direct-Touch Interaction on Horizontal Interfaces", In Proceedings of the working conference on Advanced visual interfaces, May 28, 2008, 8 pages.

Kaser, et al., "FingerGlass: Efficient Multiscale Interaction on Multitouch Screens", In Proceedings of the SIGCHI Conference on Human Factors in Computing Systems, May 7, 2011, pp. 1601-1610.

Butscher, et al., "SpaceFold and PhysicLenses: simultaneous multifocus navigation on touch surfaces", In Proceedings of International Working Conference on Advanced Visual Interfaces, May 27, 2014, 8 pages.

Bourgeois, et al., "Multiscale pointing: facilitating pan-zoom coordination", In Proceedings of Extended Abstracts on Human Factors in Computing Systems, Apr. 20, 2002, pp. 758-759.

Matsushita, et al., "Dual Touch: A Two-Handed Interface for Pen-Based PDAs", In Proceedings of the 13th annual ACM symposium on User interface software and technology, Nov. 1, 2000, pp. 211-212.

Artinger, et al., "Exploring Multi-touch Gestures for Map Interaction in Mass Casualty Incidents", In Proceedings of Workshop on the IT support of rescue workers within the framework of the GI anniversary computer science, Oct. 2011, 15 pages.

Grossman, et al., "Handle Flags: Efficient and Flexible Selections for Inking Applications", In Proceedings of Graphics Interface, May 25, 2009, pp. 167-174.

Agarawala, et al., "Keepin' it real: pushing the desktop metaphor with physics, piles and the pen", In Proceedings of the SIGCHI Conference on Human Factors in Computing Systems, Apr. 22, 2006, pp. 1283-1292.

Avery, et al., "Pinch-to-zoom-plus: an enhanced pinch-to-zoom that reduces clutching and panning", In Proceedings of the 27th annual ACM symposium on User interface software and technology, Oct. 5, 2014, pp. 595-604.

Baudisch, et al., "Drag-and-Pop and Drag-and-Pick: Techniques for Accessing Remote Screen Content on Touch-and Pen-operated Systems", In Proceedings of International Conference on Human-Computer Interaction, Sep. 1, 2003, 8 pages.

Bederson, et al., "Local tools: an alternative to tool palettes", In Proceedings of the 9th annual ACM symposium on User interface software and technology, Nov. 1, 1996, pp. 169-170.

Bezerianos, et al., "The vacuum: facilitating the manipulation of distant objects", In Proceedings of the SIGCHI Conference on Human Factors in Computing Systems, Apr. 2, 2005, pp. 361-370.

Bianchi, et al., "Designing a Physical Aid to Support Active Reading on Tablets", In Proceedings of the 33rd Annual ACM Conference on Human Factors in Computing Systems, Apr. 18, 2015, pp. 699-708.

Bier, et al., "Toolglass and Magic Lenses: The see-through interface", In Proceedings of the 20th annual conference on Computer graphics and interactive techniques, Sep. 1, 1993, pp. 73-80.

Brandl, et al., "Combining and measuring the benefits of bimanual pen and direct-touch interaction on horizontal interfaces", In Proceedings of the working conference on Advanced visual interfaces, May 28, 2008, pp. 154-161.

Buxton, Bill, "The Active Desk", http://www.billbuxton.com/ActiveDesk.html, Published on: Oct. 1, 2009, 6 pages.

Buxton, Bill, "Sketching User Experiences: Getting the Design Right and the Right Design", In Publication of Morgan Kaufmann, Apr. 11, 2007, 10 pages.

(56) References Cited

OTHER PUBLICATIONS

A. S. Buxton, William, "Chunking and phrasing and the design of human-computer dialogues", In Proceedings of the IFIP World Computer Congress, Sep. 1986, pp. 1-9.

Buxton, et al., "Continuous hand-gesture driven input", In Journal of In Graphics Interface, May 9, 1983, pp. 191-195.

A. S. Buxton, William, "Living in augmented reality: Ubiquitous Media and Reactive Environments", In Journal of Video Mediated Communication, Apr. 1997, 17 pages.

Davis, et al., "NotePals: lightweight note sharing by the group, for the group", In Proceedings of the SIGCHI conference on Human Factors in Computing Systems, May 15, 1999, pp. 338-345.

Derose, et al., "Document structure and markup in the FRESS hypertext system", In Journal of Markup Languages, vol. 1, Issue 1, Jan. 1999.

Fitzmaurice, et al., "Tracking menus", In Proceedings of the 16th annual ACM symposium on User interface software and technology, vol. 5, Issue 2, Nov. 2, 2003, pp. 71-80.

Foley, et al., "The human factors of computer graphics interaction techniques", In Journal of IEEE Computer Graphics and Applications, vol. 4, Issue 11, Nov. 1, 1984, pp. 13-48.

Forlines, et al., "Glimpse: A Novel Input Model for Multi-level Devices", In Proceedings of Extended Abstracts on Human Factors in Computing Systems, Apr. 2, 2005, 4 pages.

Grossman, et al., "Hover widgets: using the tracking state to extend the capabilities of pen-operated devices", In Proceedings of the SIGCHI Conference on Human Factors in Computing Systems, Apr. 22, 2006, pp. 861-870.

Guiard, Yves, "Asymmetric division of labor in human skilled bimanual action: The kinematic chain as a model.", In Journal of Motor Behavior, vol. 19, No. 4, Dec. 1, 1987, 23 pages.

Hailpern, et al., "Team Storm: demonstrating an interaction model for working with multiple ideas during creative group work", In Proceedings of the 6th ACM SIGCHI conference on Creativity & cognition, Jun. 13, 2007, pp. 193-202.

Hamilton, et al., "High-performance pen + touch modality interactions: a real-time strategy game eSports context", In Proceedings of the 25th annual ACM symposium on User interface software and technology, Oct. 7, 2012, pp. 309-318.

Hardock, et al., "A Marking Based Interface for Collaborative Writing", In Proceedings of the 6th annual ACM symposium on User interface software and technology, Nov. 3, 1993, pp. 259-266.

Hewett, Thomas T., "Informing the design of computer-based environments to support creativity", In International Journal of Human-Computer Studies, vol. 63, Issues 4-5, Oct. 2005, pp. 383-409.

Hinckley, et al., "InkSeine: In Situ Search for Active Note Taking", In Proceedings of the SIGCHI Conference on Human Factors in Computing Systems, Apr. 28, 2007, pp. 251-260.

Hinckley, et al., "Design and analysis of delimiters for selection-action pen gesture phrases in scriboli", In Proceedings of the SIGCHI Conference on Human Factors in Computing Systems, Apr. 2, 2005, pp. 451-460.

Hinckley, et al., "Informal Information Gathering Techniques for Active Reading", In Proceedings of the SIGCHI Conference on Human Factors in Computing Systems, May 5, 2012, pp. 1893-1896.

Hinckley, et al., "The springboard: multiple modes in one spring-loaded control", Proceedings of the SIGCHI Conference on Human Factors in Computing Systems, Apr. 22, 2006, pp. 181-190.

Hinckley, et al., "Pen + Touch=New Tools", In Proceedings of the 23nd annual ACM symposium on User interface software and technology, Oct. 3, 2010, pp. 27-36.

Khan, et al., "Spotlight: directing users' attention on large displays", In Proceedings of the SIGCHI Conference on Human Factors in Computing Systems, Apr. 2, 2005, pp. 791-798.

Kirsh, David, "The intelligent use of space", In Artificial Intelligence, vol. 73, Feb. 1995, pp. 31-68.

Klemmer, et al., "The designers' outpost: a tangible interface for collaborative web site", In Proceedings of the 14th annual ACM symposium on User interface software and technology, Nov. 11, 2001, pp. 1-10.

Kramer, Axel, "Translucent patches—dissolving windows", In Proceedings of the 7th annual ACM symposium on User interface software and technology, Nov. 2, 1994, pp. 121-130.

Krueger, et al., "Videoplace—an artificial reality", In Proceedings of the SIGCHI Conference on Human Factors in Computing Systems, Apr. 1, 1985, pp. 35-40.

Kurtenbach, et al., "Issues in combining marking and direct manipulation techniques", In Proceedings of the 4th annual ACM symposium on User interface software and technology, Nov. 11, 1991, pp. 137-144.

Kurtenbach, et al., "The design of a GUI paradigm based on tablets, two-hands, and transparency", In Proceedings of the ACM SIGCHI Conference on Human factors in computing systems, Mar. 1997, pp. 35-42.

Landay, et al., "Sketching Interfaces: Toward More Human Interface Design", In Journal of Computer, vol. 34, Issue 3, Mar. 2001, pp. 56-64.

Lank et al., "Concurrent bimanual stylus interaction: a study of non-preferred hand mode manipulation", In Proceedings of Graphics Interface, Jun. 7, 2006, 8 pages.

Leitner, et al., "Harpoon selection: efficient selections for ungrouped content on large pen-based surfaces", In Proceedings of the 24th annual ACM symposium on User interface software and technology, Oct. 16, 2011, pp. 593-602.

Li, et al., "Experimental analysis of mode switching techniques in pen-based user interfaces", In Proceedings of the SIGCHI Conference on Human Factors in Computing Systems, Apr. 2, 2005, pp. 461-470.

Lindlbauer, et al., "Perceptual grouping: selection assistance for digital sketching", In Proceedings of the ACM International conference on Interactive tabletops and surfaces, Oct. 6, 2013, pp. 51-60.

Marshall, et al., "Saving and Using Encountered Information: Implications for Electronic Periodicals", In Proceedings of the SIGCHI Conference on Human Factors in Computing Systems, Apr. 2, 2005, pp. 111-120.

Matulic, et al., "Pen and touch gestural environment for document editing on interactive tabletops", In Proceedings of the ACM international conference on Interactive tabletops and surfaces, Oct. 6, 2013, pp. 41-50.

Mizobuchi, et al., "Tapping vs. circling selections on pen-based devices: evidence for different performance-shaping factors", In Proceedings of the SIGCHI Conference on Human Factors in Computing Systems, Apr. 22, 2004, pp. 607-614.

Moran, et al., "Pen-based interaction techniques for organizing material on an electronic whiteboard", In In Proceedings of the 10th annual ACM symposium on User interface software and technology, Oct. 1, 1997, pp. 45-54.

Mynatt, et al., "Flatland: new dimensions in office whiteboards", In Proceedings of the SIGCHI conference on Human Factors in Computing Systems, May 15, 1999, pp. 346-353.

Perlin, et al., "Pad: An Alternative Approach to the Computer Interface", In Proceedings of the 20th annual conference on Computer graphics and interactive techniques, Sep. 1, 1993, pp. 57-64.

Perteneder, et al., "Cluster: Smart Clustering of Free-Hand Sketches on Large Interactive Surfaces", In Proceedings of the 28th Annual ACM Symposium on User Interface Software & Technology, Nov. 7 2015, pp. 37-46.

Pfeuffer, et al., "Partially-indirect Bimanual Input with Gaze, Pen, and Touch for Pan, Zoom, and Ink Interaction", In In Proceedings of the 2016 CHI Conference on Human Factors in Computing Systems, May 7, 2016, pp. 2845-2856.

Pier, et al., "Issues for Location-Independent Interfaces", In Technical Report ISTL92-4, Dec. 1992, pp. 1-8.

Pierce, et al., "Toolspaces and Glances: Storing, Accessing, and Retrieving Objects in 3D Desktop Applications", In Proceedings of symposium on Interactive 3D Graphics, Apr. 26, 1999, pp. 163-168.

(56) References Cited

OTHER PUBLICATIONS

Pook, et al., "Control menus: Execution and control in a single interactor", In Proceedings of ACM CHI Conference on Human Factors in Computing Systems, Apr. 1, 2000, pp. 263-264.

Purcell, et al., "Drawings and the design process", In Journal of Design Studies, vol. 19, Issue 4, Oct. 1998, pp. 389-430.

Raskin, Jef, "The Humane Interface: New Directions for Designing Interactive Systems", In Publication of ACM Press, Mar. 29, 2000.

Robertson, et al., "Fix and float: object movement by egocentric navigation", In Proceedings of the 10th annual ACM symposium on User interface software and technology, Oct. 1, 1997, pp. 149-150.

Ruiz, et al., "A study on the scalability of non-preferred hand mode manipulation", In Proceedings of the 9th International conference on Multimodal interfaces, Nov. 12, 2007, pp. 170-177.

Schon, Donald A., "Designing as reflective conversation with the materials of a design situation", In Journal of Research in Engineering Design, vol. 3, Issue 3, Sep. 1992.

Schwarz, et al., "A framework for robust and flexible handling of inputs with uncertainty", In Proceedings of the 23nd annual ACM symposium on User interface software and technology, Oct. 3, 2010, pp. 47-56.

Sellen, et al., "The prevention of mode errors through sensory feedback", In Journal of Human Computer Interaction, vol. 7, Issue 2, Jun. 1992 , pp. 141-164.

Sellen, et al., "How Knowledge Workers Use the Web", In Proceedings of the SIGCHI Conference on Human Factors in Computing Systems, Apr. 20, 2002, pp. 227-234.

Shah, et al., "Collaborative Sketching (C-Sketch)—An Idea Generation Technique for Engineering Design", In Journal of Creative Behavior, vol. 35, Issue 3, Sep. 2001.

Shipman, et al., "Formality Considered Harmful: Experiences, Emerging Themes, and Directions on the Use of Formal Representations in Interactive Systems", In Journal of Computer-Supported Cooperative Work, vol. 8, Issue 4, Dec. 1999, pp. 1-18.

Shneiderman, Ben, "Creativity support tools: accelerating discovery and innovation", In Journal of Communications of the ACM, vol. 50, Issue 12, Dec. 2007, pp. 20-32.

Tesler, Larry, "The smalltalk environment", In Publication of Byte, Aug. 15, 1981.

Wagner, et al., "BiTouch and BiPad: Designing Bimanual Interaction for Hand-held Tablets", In Proceedings of the SIGCHI Conference on Human Factors in Computing Systems, May 5, 2012, pp. 2317-2326.

Wagner, et al., "Multi-finger chords for hand-held tablets: recognizable and memorable", In Proceedings of the SIGCHI Conference on Human Factors in Computing Systems, Apr. 26, 2014, pp. 2883-2892.

Wobbrock, et al., "User-defined gestures for surface computing", In Proceedings of the SIGCHI Conference on Human Factors in Computing Systems, Apr. 4, 2009, pp. 1083-1092.

Yamamoto, et al., "Interaction design of tools for fostering creativity in the early stages of information design", In International Journal of Human-Computer Studies—Special issue: Computer support for creativity, vol. 63 Issue 4-5, Oct. 2005.

Zeleznik, et al., "Hands-on math: a page-based multi-touch and pen desktop for technical work and problem solving", In Proceedings of the 23nd annual ACM symposium on User interface software and technology, Oct. 3, 2010, pp. 17-26.

Gupta, et al., "Multitouch Radial Menu Integrating Command Selection and Control of Arguments with up to 4 Degrees of Freedom", In Proceedings of the International Working Conference on Advanced Visual Interfaces, Jun. 7, 2016, pp. 256-263.

Lin, et al., "Style-preserving English handwriting synthesis", In Journal of Pattern Recognition, vol. 40, Issue 7, Jul. 2007, pp. 2097-2109.

"Non Final Office Action Issued in U.S. Appl. No. 15/437,362", dated Nov. 29, 2018, 22 Pages.

"Final Office Action Issued in U.S. Appl. No. 15/437,362", dated Jun. 25, 2019, 22 Pages.

"Notice of Allowance Issued in U.S. Appl. No. 15/437,362", filed Sep. 30, 2019, 18 Pages.

* cited by examiner

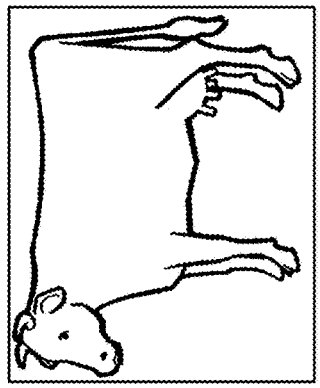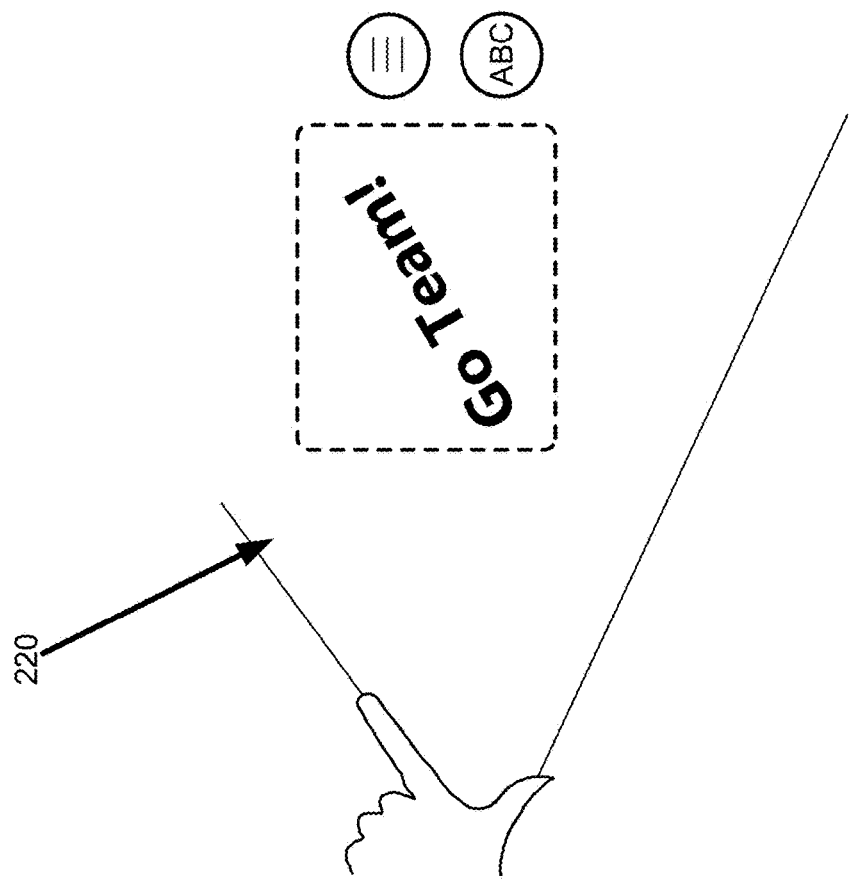
FIG. 3B

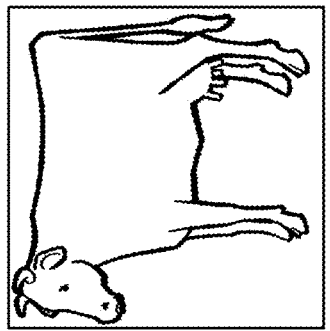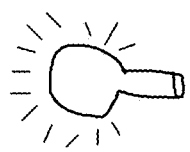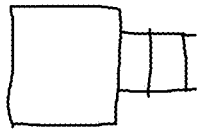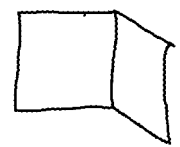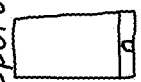
FIG. 4

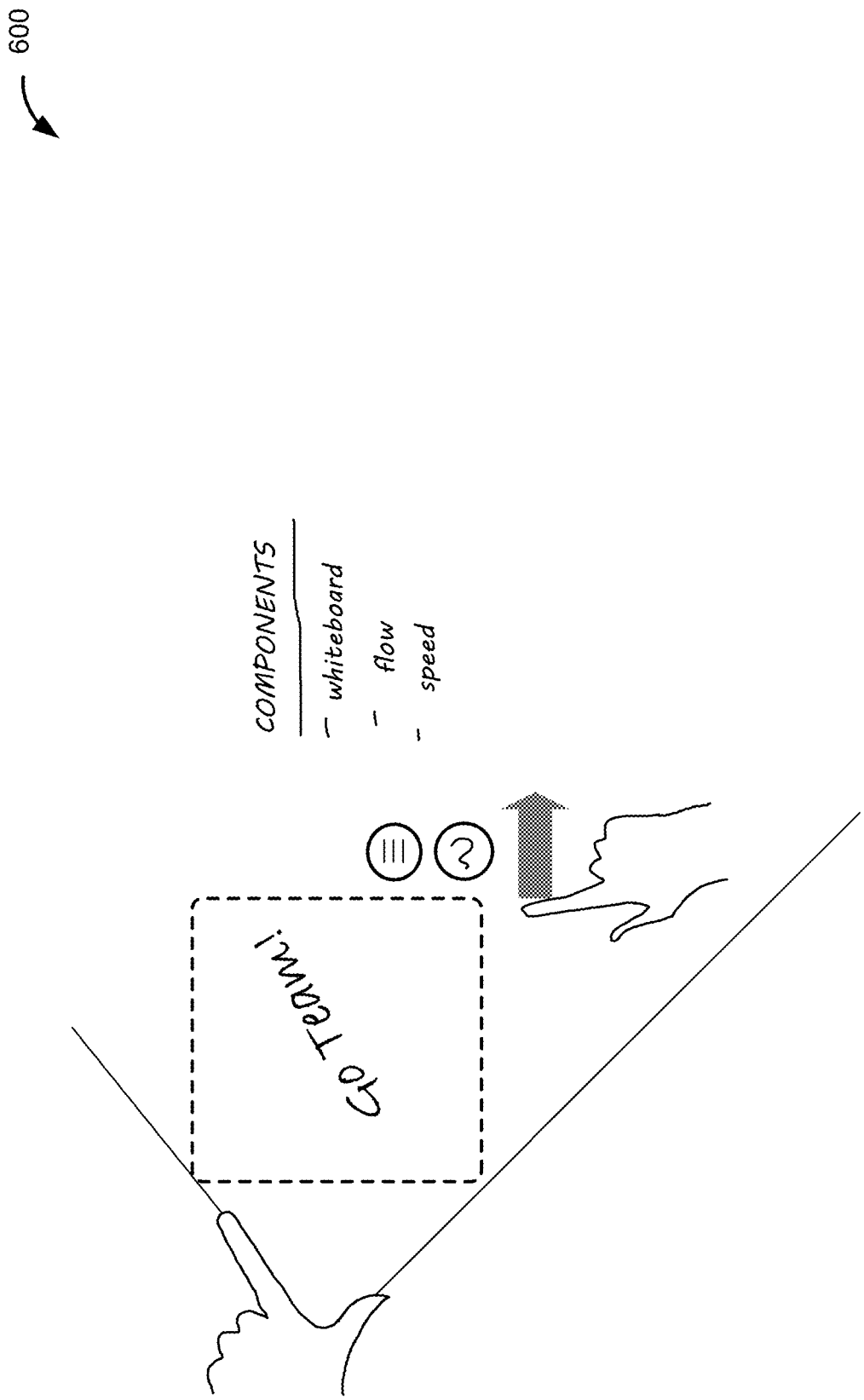

UNIFIED SYSTEM FOR BIMANUAL INTERACTIONS

BACKGROUND

Users interact with touchscreens via a variety of interaction techniques. Whether performing a single tap, a ballistic tap, multi-finger gesture, or using a pen, users are able to hold the computing device in their hands or on a supporting surface. Accordingly, interacting with any position on the touchscreen is readily achievable.

However, as touchscreens and electronic whiteboards have continued to get larger, the customary techniques for interacting with small touchscreens, such as are provided on a watch, mobile phone, tablet, laptop or other personal computing device, have become unsatisfactory and impracticable. Further, the existing interaction techniques for providing ink on large displays often require specific devices, result in difficulty with performing large scale touch gestures, or tie up screen real estate with designated interaction areas. Likewise, providing interaction in-place on large displays, close to the locus of interaction, may also provide follow-on benefits in terms of efficiency, maintaining the flow of visual attention, and chunking multiple operations together into unified action-sequences—even on smaller screens, such as those of tablets, laptops, and interactive drafting tables.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Aspects of systems and methods for implementing a unified system for bimanual interactions are discussed herein. The unified system for bimanual interactions provides a lightweight and integrated interface that allows the user to efficiently interact with and manipulate content in the user interface. The system is configured to detect an interaction on the touchscreen and to differentiate whether the user intends to pan, zoom or frame a portion of the user interface. According to one aspect, the framing interaction is identified by detection of the thumb and forefinger (and/or additional fingers) of the user's non-preferred hand on the touchscreen, which cooperate to define a focus area between vectors extending outwards from the user's thumb and forefinger. According to another aspect, the framing interaction is identified by detection of a finger of the non-preferred hand on the touchscreen, which defines a focus area extending outwards from the finger (resizable based on the pressure of the finger) and oriented based on the hand, wrist, or other contextual information regarding the user's hand. When the framing interaction is associated with multi-finger interactions, the unified system is operable to provide visual feedback of a potential selection while the system remains in a "speculating state," which provides the ability for the user to select or zoom simultaneously. Upon a determination that the user intends to make a selection, the unified system for bimanual interactions provides an indication of the objects that are located within the focus area and contextual menus for interacting with the objects. The use of these contextual menus support flexible, interpretation-rich representations of content that are organized in levels along four conceptual axes of movement, including a structural axis, a semantic axis, a temporal axis, and a social axis. Each of these axes may offer multiple gradations of representation. Based on which end of the contextual axis is selected, the user can progressively add formality and structure to a representation by moving up a level, or revert to a less-structured representation by moving down a level in the opposite direction. Moreover, as the formality and structure to a representation changes, the representation may be recognized, re-structured, or reinterpreted.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIG. 3A-3B are illustrations of example graphical user interfaces in which a unified system for bimanual interactions is implemented;

FIG. 4 is an illustration of example graphical user interface in which a unified system for bimanual interactions is implemented;

FIGS. 6A-6B are illustrations of example graphical user interfaces in which a unified system for bimanual interactions is implemented;

DETAILED DESCRIPTION

Figure 1:
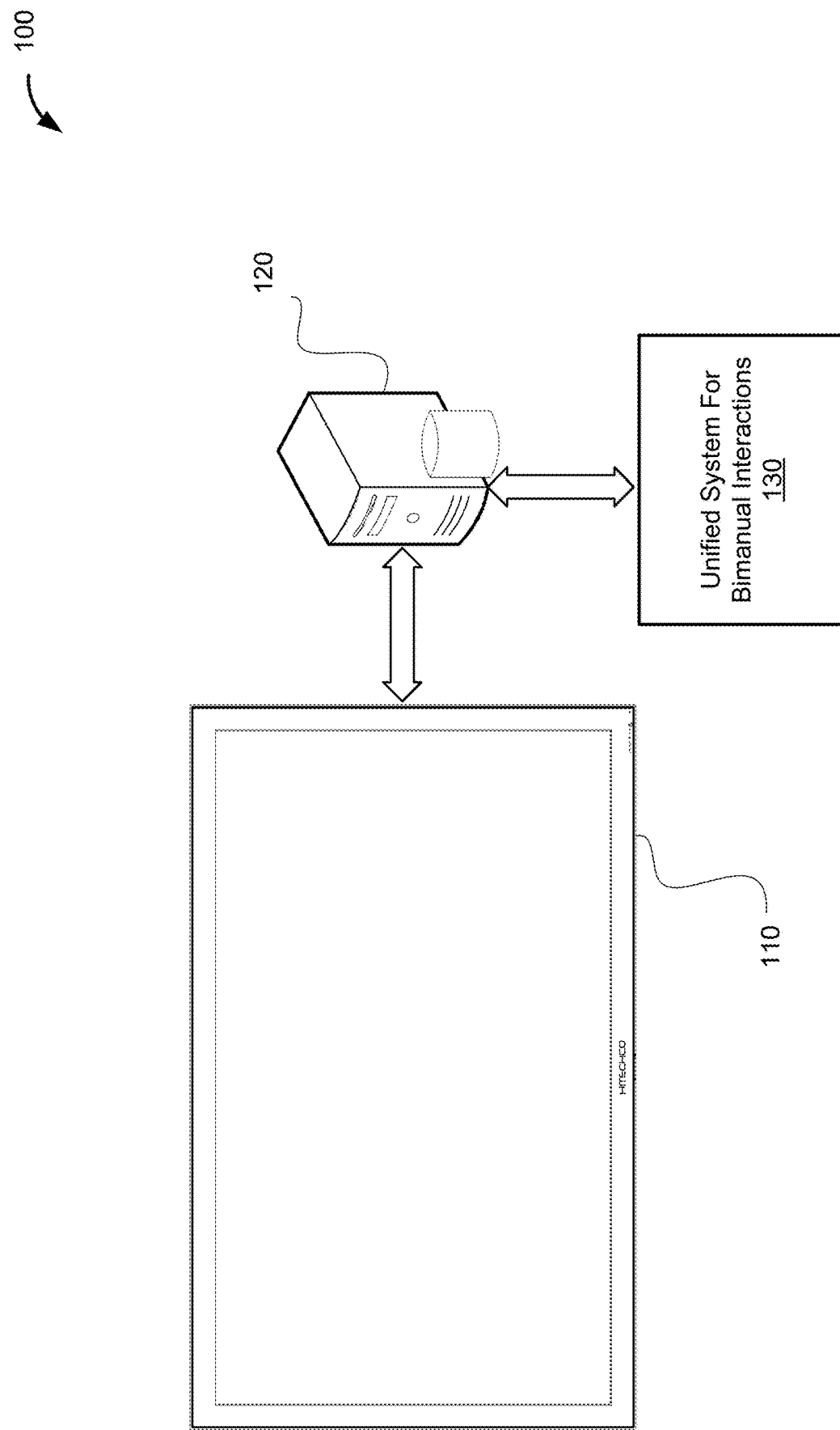
FIG. 1 is a block diagram illustrating an example computing environment implementing a unified system for bimanual interactions.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

FIG. 1 is a block diagram illustrating an example computing environment 100 implementing a unified system for bimanual interactions 130.

As illustrated, the example computing environment 100 includes a touchscreen display 110 in communication with a computing device 120. The touchscreen display including, without limitation, whiteboards, tablets, mobile devices, or other touch or gesture devices configured for bimanual interactions. Further, the computing device 120 is in communication with a unified system for bimanual interactions 130.

The unified system for bimanual interactions 130 provides a lightweight and integrated interface that allows the user to efficiently interact with and manipulate content in the user interface. The system is configured to detect a multi-finger interaction on the touchscreen and to differentiate whether the user intends to pan, zoom or frame a portion of the user interface. Generally, the framing interaction is identified by detection of the user's thumb and forefinger on the touchscreen, which cooperate to define a focus area between vectors extending outwards from the user's thumb and forefinger. Simultaneous with interpreting multiple such touches as pan/zoom operations, the system allows concurrent interaction or manipulation of content framed within the focus area. The unified system for bimanual interactions 130 speculatively fades-in an indication of the objects that are located within the focus area, as well as contextual menus for interacting with the objects. This fade-in does not interfere with pan-zoom manipulations, nor do ongoing pan-zoom gestures preclude interaction with, or manipulation of, the framed content. Both interpretations of multi-finger gestures are fed forward by the system, in parallel, such that zooming can smoothly transition to selection, and acting on the selection, without initiating a new gesture.

The computing device 120 is illustrative of a variety of computing systems including, without limitation, desktop computer systems, large display device, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers. The hardware of these computing systems is discussed in greater detail in regard to FIGS. 15, 16A, 16B, and 17. In various aspects, the computing device 120 is accessible locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

Figure 2:
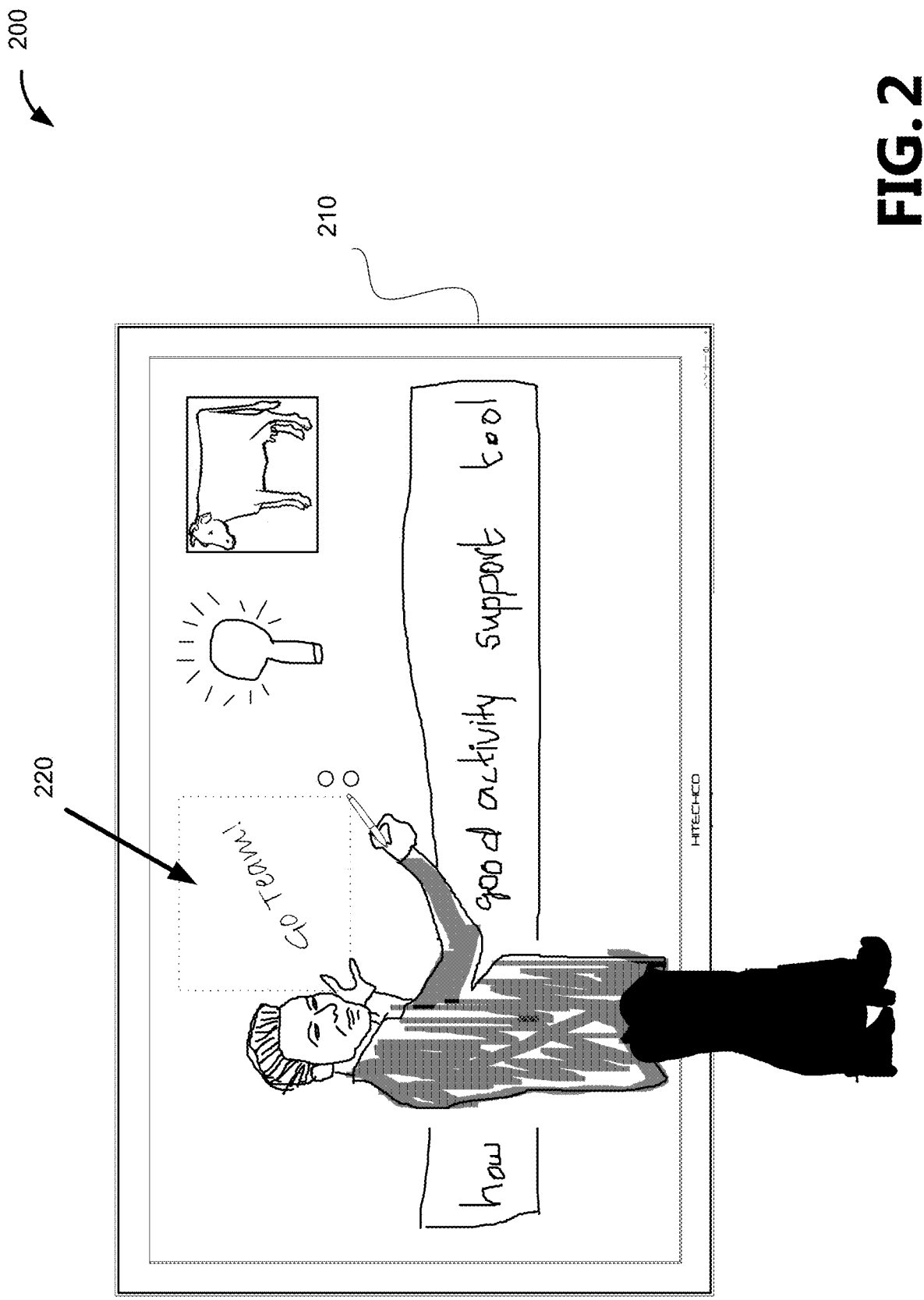
FIG. 2 is an illustration of example environment illustrating implementation of a unified system for bimanual interactions.

FIG. 2 is an illustration of example environment 200 illustrating implementation of a unified system for bimanual interactions 130. In the illustrated example, the user is presenting content on an electronic whiteboard 210. However, it should also be recognized that the unified system for bimanual interactions 130 may be utilized with tablets, mobile devices, or other computing devices having a touchscreen display. In another example, the unified system may be utilized with non-touch displays, head-mounted displays, or remotely located displays by receipt of bimanual interactions 130 via a touchpad and a mouse, e.g., a user's use of the touchpad by a non-preferred hand and use of a mouse by a preferred hand.

The unified system for bimanual interactions 130 provides a lightweight and integrated interface for users to work on a particular portion of a user interface. The unified system for bimanual interactions 130 enables the user to focus attention on 'the workspace,' i.e. the portion of the screen devoted to working with content (as opposed to toolbars, icons, panels, or other persistent user interface elements typically arranged around the edges of a display, or application window). As illustrated in FIG. 2, the user is able to frame a portion of the user interface using the non-preferred hand to define a focus area 220. Further, the user is able to use their preferred hand to interacting with and/or manipulating the content. In other examples, the user may interact with the user interface by utilizing a pen in their preferred hand. Using the non-preferred hand to indicate the desired content, and the preferred hand to act upon it, is particularly desirable because this corresponds with how people have been observed to naturally use their hands for everyday tasks.

Figure 3A:
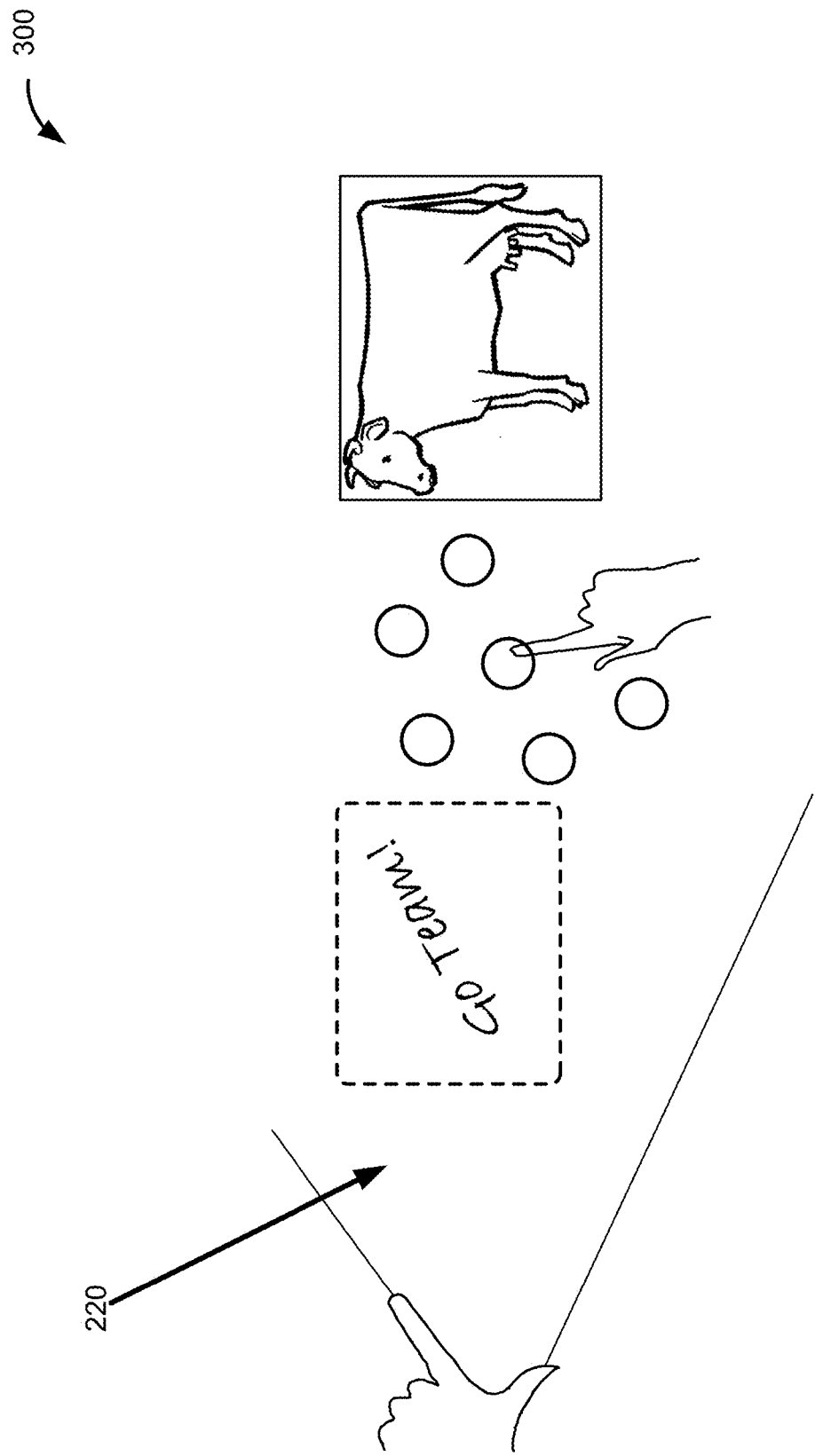

FIGS. 3A-3B are illustrations of example graphical user interfaces 300 in which a unified system for bimanual interactions 130 is implemented. As discussed above, the unified system for bimanual interactions 130 enables the user to focus attention on some specific desired subset of content within the workspace of a user interface, for selectively acting upon the desired content consisting of one or more objects, while excluding other parts of the screen from the operation.

According to one aspect, the user frames a portion of the workspace, thereby defining a focus area on the user interface. In one example, the user frames the desired handwriting (typically consisting of a plurality of small ink-stroke objects) using a framing interaction on the user interface. Specifically, in FIG. 3A-3B, the framing interaction is illustrated as a multi-finger interaction including the thumb and forefinger of the user's non-preferred hand. Generally, the focus area 220 is defined by the area located between vectors extending outwards from the user's thumb and forefinger. In some aspects, additional fingers (or portions of the palm, or side of the hand) of the same hand may rest on the display as well, or alternative fingers can be used, such that the thumb and forefinger do not necessarily have to be used to 'frame' the desired area. In one example, the visualization of a semi-transparent palette is configured to provide a perception as a natural extension of the hand. For example, the semi-transparent palette mimics the cleft between thumb and forefinger, thereby fitting into the hand, so that it feels like a projection of one's reach. Further, in another example, the rounded area at the apex of the palette can be used as a place where the user can tuck away objects and carry them in a temporary clipboard.

Further, the focus area 220 extends outward from the user's thumb and forefinger by a selected distance. In some aspects, this extent is proportional to the size of the screen. In other aspects, the geometry of additional fingers from the same hand influences the extent. In yet other aspects, the focus area 220 extends a distance based on the user preferences. In further aspects, implicitly recognized (e.g. through ink analysis and recognition) or manually specified groupings of objects may also be taken into account when the system decides how far to extend the focus area 220. The palette is preferentially rendered with a semi-transparent gradient that trails off with the distance from the apex, which illuminates the selection area with a soft-edged feel. The unified system for bimanual interactions 130 provides an indication of the content that is located within the focus area 220. Content outside of the focus area 220 remains unselected by the user. In one example, the unified system for bimanual interactions 130 highlights objects in the selection with a bright-red outer glow. In another example, the unified system for bimanual interactions 130 also highlights objects with a dashed-line roundtangle (i.e., a quadrilateral with rounded corners) around all the selected objects with menus providing functionality for interacting with the objects.

While the illustrated framing interaction is similar to the pinch-to-zoom gesture, the framing interaction and the pinch-to-zoom gesture can co-exist because of the intuitive visual feedback associated with the unified system for bimanual interactions 130. At any subtle hesitation while zooming using the pinch-to-zoom gesture, selection feedback starts to fade-in on the user interface. As users encounter and notice the selection feedback, the users are able to intuitively recognize that the framing interaction allows the user to select the relevant portion of the user interface without further explanation. Thus, the users are able to take advantage of the framing interaction or continue to zoom.

According to one aspect, the unified system for bimanual interactions 130 implements functionality to further distinguish the framing interaction from the pinch-to-zoom gesture. Specifically, in one example, the framing interaction is triggered based on the motion dynamics, including one or more of spatial and temporal qualities of the gesture/interaction. Touching the user interface and holding the framing interaction for a fixed timeout causes the unified system for bimanual interactions 130 to trigger a selection. In another example, the pinch-to-zoom interpretation of two-finger gestures dominates selection such that panning and zooming responds immediately without providing selection feedback. But if the user hesitates while zooming, the unified system for bimanual interactions 130 starts to fade in only the illumination of a semi-transparent palette of tools, which is shown in FIG. 3A. However, if the pinch-to-zoom motion resumes, all selection feedback fades out completely. In one aspect, pinch-to-zoom can smoothly transition to the framing gesture, and bring up selection feedback and the semi-transparent palette, by touching down additional fingers. In another aspect, the selection feedback and semi-transparent palette can be reserved to a specific number of fingers (e.g., five fingers, or three fingers) which transitions back and forth to pan/zoom when only two fingers are present.

When the unified system for bimanual interactions 130 detects that the framing interaction is the desired functionality, the frame "latches in" the palette, as in FIG. 3B. In one example, the unified system for bimanual interactions 130 detects that the framing interaction is the desired functionality when the user holds the framing interaction stationary. In another example, the unified system for bimanual interactions 130 detects that the framing interaction is the desired functionality when the framing interaction exhibits less than 10 mm of finger movement over a 500 ms time-window. However, this is unlike a traditional dwell time because the user does not have to wait 500 ms to act on the highlighted objects. Since the radial menus start fading in with the object highlighting, the user can accelerate the fade-in transition by touching down on a menu immediately, or by grabbing the objects, such as to drag them to a new position. In some aspects, the instant two fingers touch down on the canvas, the (still-invisible) focus area 220 is active, and can be manipulated or gestured immediately by the user.

According to another aspect, the framing interaction operates as a mode switch and input filter. More specifically, the framing gesture itself also serves as a non-preferred hand mode switch that allows the user to gesture-through the semi-transparent palette. Accordingly, pen strokes or finger drag gestures articulated by the preferred hand within the palette are interpreted as gestures, which can be recognized and interpreted with respect to the selected objects, rather than just creating an ink stroke. For example, via touch the user is able to drag the selected objects to a new position on the user interface or manipulate a selected object. The pen can crop, cut, or otherwise modify the contents as a special-purpose tool. Thus, the framed area doubles as an input filter that modifies the interpretation of pen or touch gestures in this area, and pen gestures may take on a different (complementary) interpretation to pen or touch gestures if desired.

Further, FIGS. 3A and 3B illustrate an example of how the unified system for bimanual interactions 130 enables the interaction and manipulation of ink. More specifically, the menu options enable the unified system for bimanual interactions 130 to provide various context-dependent functionalities in the radial menus to interact and manipulate the objects within the focus area 220. As illustrated in FIG. 3A, the selected objects include ink stating "Go team!" For example, a semantic axis within a radial context menu may include functionality to recognize the text itself, while preserving the position, point size, and orientation of handwritten strokes such as depicted in FIG. 3B. Moreover, the user can revert to the original ink strokes—that is, unrecognize them, by reversing the direction of movement along the menu's semantic axis of representation—to make corrections or add to the handwritten strokes. In other aspects, the functionality may otherwise be arranged in opposing sides of an axis.

FIG. 4 is an illustration of example graphical user interface 400 in which a unified system for bimanual interactions 130 is implemented. According to one aspect, the unified system for bimanual interactions 130 provides flexibility to posture and adjustment the framing interaction.

As discussed above, when the unified system for bimanual interactions 130 detects that the framing interaction is the desired functionality the framing "latches in" the palette. Once the framing interaction latches in the pan/zoom interpretation is unavailable, but the user is able to move, reorient, and adjust the angle subtended by the framing without disturbing the canvas. Thus, in order to return to pan/zoom, the user must lift the non-preferred hand, which dismisses the framing. This approach allows zooming to be freely combined with selection highlighting until the framing interaction latches in. The user can zoom in close to select a single ink stroke—or zoom out to select a large area (even the entire workspace, or multiple workspaces), or distant objects that would normally be out-of-reach. However, the framing interaction is adjustable based on the user re-orienting a thumb and forefinger, which allows the user to steer, re-orient, and otherwise manipulate the framed area. Furthermore, the angle of the framing interaction is adjustable based on a function of the angle subtended by user's thumb and forefinger, which allows the framed area to be focused into a narrow beam or expanded to include a wider selection.

Figure 5:
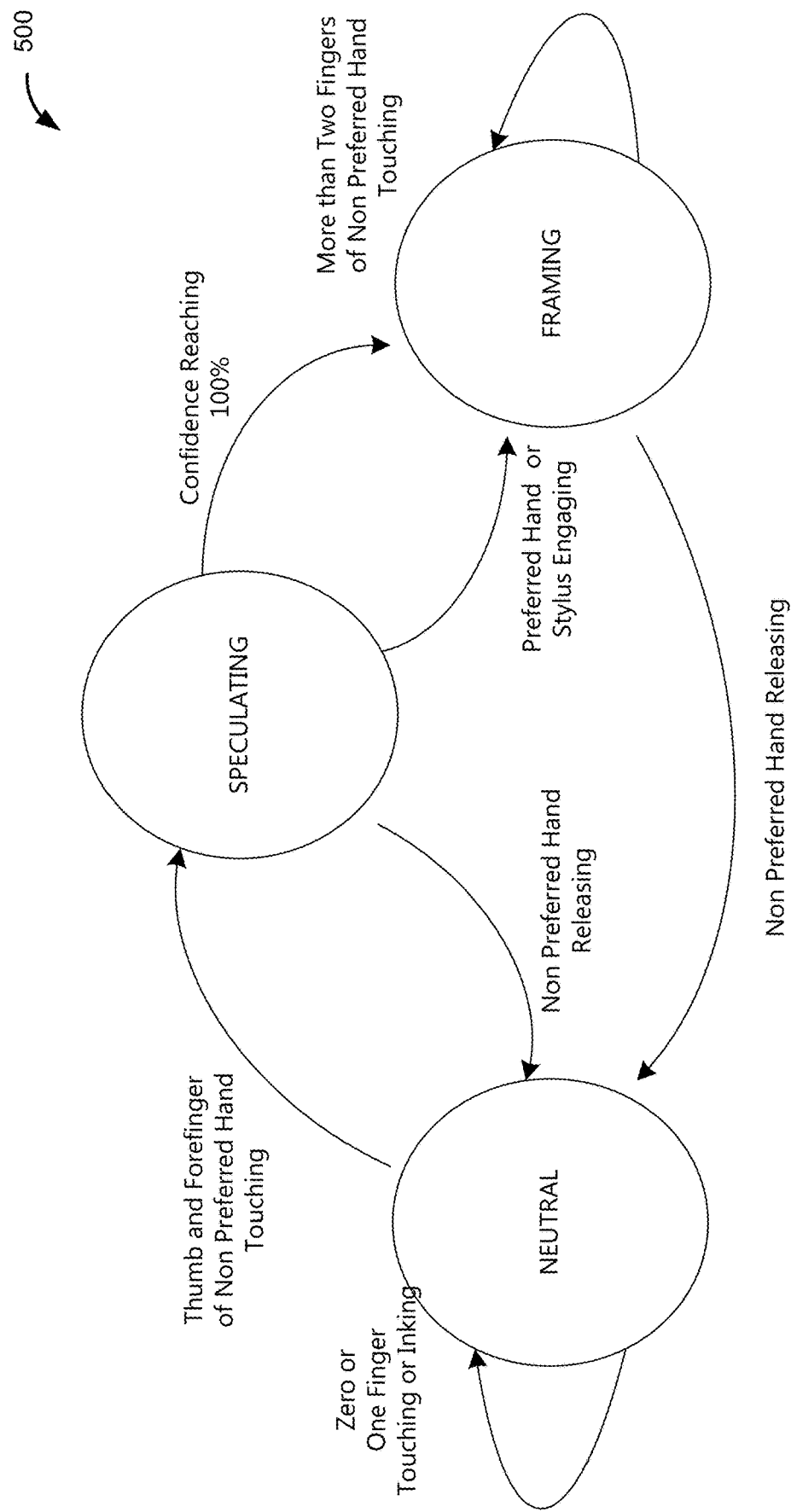
FIG. 5 is a block diagram illustrating an example state-transition model for a unified system for bimanual interactions.

FIG. 5 is a block diagram illustrating an example state-transition model 500 for a unified system for bimanual interactions 130. The interaction starts in the neutral state, with zero or one finger on the display. In response to detection of two touches from the non-preferred hand (typically, but not necessarily, the thumb and forefinger), the neutral state transitions to a speculating state where both pinch-to-zoom and selection are active. Further, in the speculating state, the selection feedback starts to fade in proportionally to the system's confidence, e.g., the degree of movement vs. hesitation, which can be computed as an exponentially-weighted function of recent motion samples from the finger(s) or through use of machine learning to determine the system's confidence. Once the user holds the framing interaction stable for a predetermined period of time or interacts with the framed area or radial menus, the speculating state transitions to the framing state (i.e., the framing interaction is latched in). Further, according to aspects, the speculating and framing states allow more than two fingers to rest on the canvas if desired, which allows the user to comfortably rest the whole hand on the user interface. Furthermore, note that in one aspect, the framing gesture is preferentially bound to touches from the non-preferred hand, either through convention and design assumptions built into the software, or through a direct sensing mechanism (such as sensing motion-signals from a wearable device on the wrist, skeletal tracking provided by a depth-camera associated with the display, and so forth). In other aspects—whether the specific hands can be sensed and distinguished—the "first hand" to touch down triggers framing, and the "second hand" triggers manipulation or action. Heuristics may be used to resolve which way to orient the framing region (given that there is a 180-degree ambiguity of which way it should face), such as the geometry of the touches, the time dynamics of the touches, and location of the touches on the display. In some aspects, "tapping behind" the framing area with a third finger, or the opposite hand, flips the direction of the framing region by 180 degrees. Furthermore, in some aspects, the user may "pin down" the semi-transparent palette (e.g. through tapping on a thumbtack icon adjacent to the palette, or exerting additional pressure on a pressure-sensing screen) to allow the palette to persist after lifting the hand(s), which is particularly advantageous for usage contexts that may require one-handed interaction.

Figure 6B:
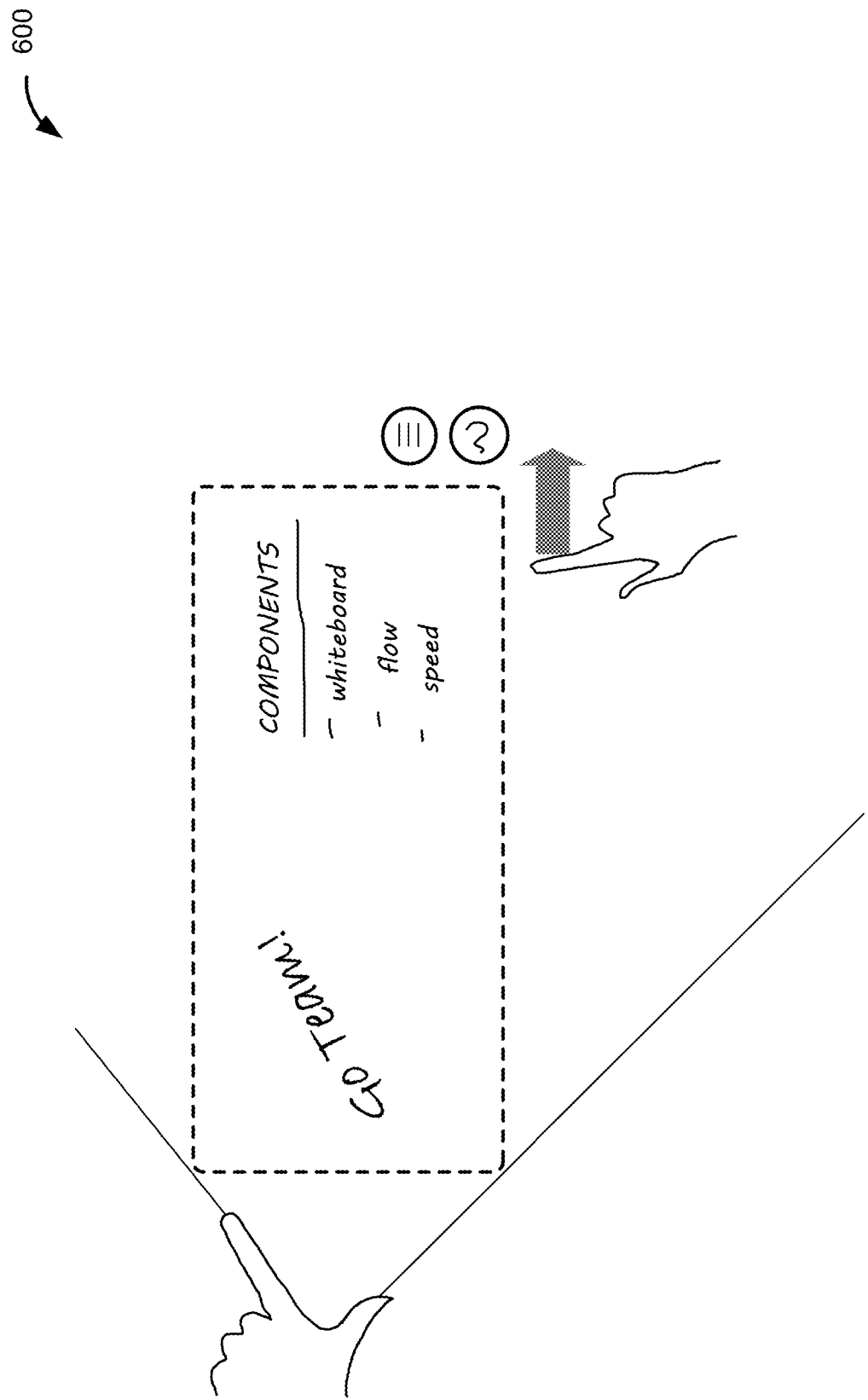

FIGS. 6A-6B are illustrations of example graphical user interfaces 600 in which a unified system for bimanual interactions 130 is implemented. As discussed above, the focus area 220 extends outward from the user's thumb and forefinger by a selected distance. In one example, the default distance is selected at one-fifth of the user interface, as shown in FIG. 6A. However, if it is necessary to adjust the framed area, the user can simply swipe the framed area with the preferred hand to directly adjust its extent. For example, the user may touch and drag the semi-transparent palette to the desired distance, as shown in FIG. 6B. In some aspects, the motion dynamics of the non-preferred hand also influence the size of the selection region; for example, a rapidly-stabilized framing gesture or rapid sliding of the frame across the display stretches the extent of the framing region, while a deliberate or carefully articulated movement preferentially treats the gesture as indicating a smaller, more precisely circumscribed area. Automatic clustering of inkstrokes (or other objects) nearby may also influence the chosen extent. In yet other aspects, the pressure of the touch could affect the size of the selection region. For example, a light touch might select a small region whereas a strong touch might select a larger region.

Figure 7:
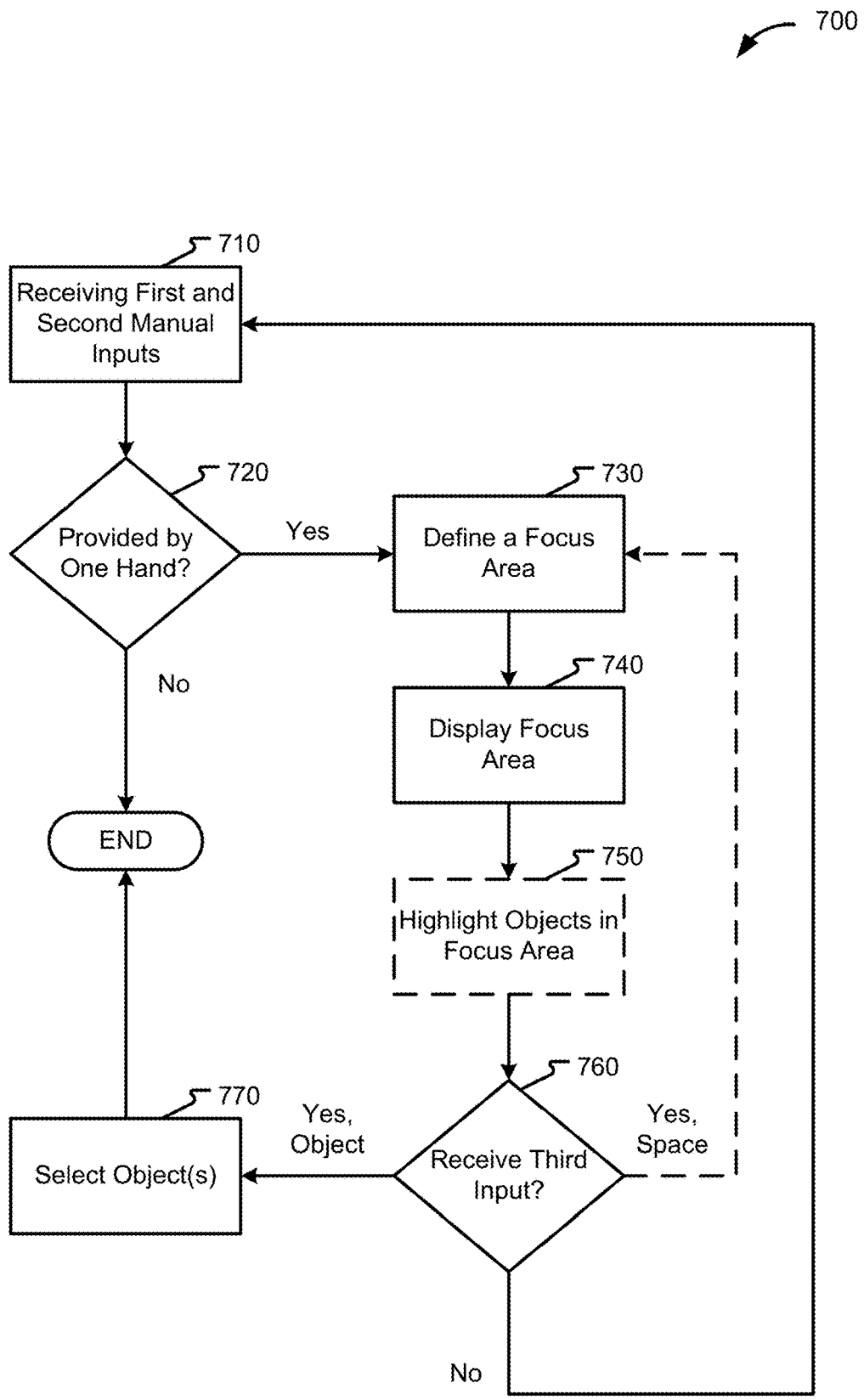
FIG. 7 is a flow chart showing general stages involved in an example method for a unified system for bimanual interactions.

FIG. 7 is a flow chart showing general stages involved in an example method 700 for implementing a unified system for bimanual interactions 130. Method 700 begins at OPERATION 710, where a first and a second manual input are received in an application canvas. In various aspects, the application canvas includes the authoring area of a productivity application, a display area of a gaming application, or a desktop environment of an operating system displayed on a touch capable device. Control areas (such as a menu or a ribbon) of the applications displayed on the touch capable device may be excluded or included from the application canvas in various aspects. In most aspects, each of the manual inputs are received by the touch capable device at OPERATION 710 concurrently, although the first manual input may be received at an initial time and the second manual input at a later time. Additionally, accessibility options may allow for the first manual input to be persisted after a touch input device (e.g., stylus, finger) has been removed from contact with the touch capable device to allow concurrent input of a second manual input despite only one input device being used. Although examples are given herein primarily in terms of "hands" and "fingers", one of ordinary skill in the art will appreciate that method 700 is operable to implement bimanual interactions via a plurality of other input devices, including multi-touch touchpads or touch digitizers that lack integrated displays.

Proceeding to DECISION 720, it is determined whether the first and second manual inputs are provided by one "hand" as part of a bimanual focus area defining input. When it is determined that the two manual inputs are not part of a bimanual focus area defining input, method 700 may end or repeat analysis of the two inputs to determine if they later define a bimanual focus area defining input. When it is determined that the two manual inputs are part of a bimanual focus area defining input, method 700 proceeds to OPERATION 730. To determine whether the first and second manual inputs are provided by one "hand", the touch capable device may examine a distance between the manual inputs (e.g., are the inputs within a hand span distance threshold), detect additional hand components (e.g., more fingers, fingerprints, knuckles, a palm) in contact or proximity with a touch surface, receive a signal from a pointing device requesting a focus area 220, or a proximity or inertial-motion signal from a smart watch or other device indicating the presence of a user's hand.

In various aspects of DECISION 720, a determination may be made to ignore an input that would otherwise define one "hand" as part of a bimanual focus area defining input when it is determined that a dominant hand is being used. In some aspects, since a user may be more likely to use a dominant hand for multi-touch gestures (e.g., direct manipulation of the size and orientation of an object) than for defining a focus area, the two manual inputs may be treated as a non-focus area defining multi-touch input when it is determined that a dominant hand is being used. Whether a given hand is dominant or non-dominant may be defined by a user (e.g., a right/left handed preference setting), user preferences stored in a wearable device, based on the presence of a smart watch (which wrist it is worn on indicating a non-dominant hand) or other inferences based on the geometry and dynamics of the touch, or may be assumed to be a given hand. The two manual inputs may be related to a hand based on a presence of a third input (leftward or rightward of the two manual inputs, indicating the opposite hand is making the two manual inputs), a shape of the contact point indicating finger/hand orientation, the presence of other hand components, where the touch-points are on the screen (near an edge, towards one side or the other, etc.), or where the user is sensed to be standing relative to the display (e.g. by a depth camera such as the KINECT®, offered by Microsoft Corp. of Redmond, Wash.).

At OPERATION 730 a focus area is defined. Two vectors, one associated with each manual input, are extended away from the hand for a given distance. In various aspects, the given distance is one fifth of the displayed application canvas (up to an edge of the application canvas), but may be adjusted by the user via various setting and later revisions. In some aspects, each vector may be extended for different distance from the hand. The two vectors intersect in an area associated with the palm of the hand and extend outward along the fingers that provide the two manual inputs, passing through the input points and extending therefrom. In various aspects, the location of the intersection point is determined by a third contact that is part of the hand (e.g., a palm resting on the touch capable device) or at a predefined distance and angle from the two manual inputs. An arc extends between the two vectors (at the given distance) to define an area for the focus area. In various aspects, the arc may have various curvatures, including no curvature (defining a triangular focus area 220), that may be set and adjusted by the user. In other examples, the focus area 220 is otherwise arranged in varying sizes and shapes. In some aspects, the focus area 220 may preferentially extend all the way to the edge of the screen, or to the edge of the interaction area containing the objects (such as that defined by an application window, a column of text, or a sub-pane of a user interface workspace).

The focus area 220 is displayed in the application canvas at OPERATION 740. In various aspects, the focus area 220 may be displayed with different colors and transparencies as an overlay (or underlay) of the objects within the application canvas. The vectors and/or arc may be displayed in additional aspects, as may various focus area controls. Optionally, at OPERATION 750, the objects within the focus area are visually highlighted to distinguish them from objects outside of the focus area. Highlighting includes, but is not limited to: providing an edge color, a transparent overlay, an overlay color, shadow effect, shine/sparkle effect, animation effect (e.g., a bounce or twitch), an XOR type of effect that contrasts with underlying content, etc.

Proceeding to DECISION 760, it is determined whether an additional touch input has been received. In various aspects, the touch input may be from the same hand as the two manual inputs, a different hand, or from a pointing device. In various aspects, the additional touch input is a single- or multi-finger input or a gesture, which may be interpreted differently (to perform various actions) based on the application providing the application canvas, user preferences, a location at which it is received, and the objects identified in the focus area. The modality of the input (such as touch vs. pen, or their use in combination) may also distinguish the interpretation of the resulting gesture. In some aspects, natural language (voice) input may also be interpreted in the context of the currently indicated region, e.g., "send this to Bill," "enhance contrast," or "find more [images] like this."

In response to determining that no additional touch input has been received, method 700 returns to OPERATION 710. As users may squeeze or widen their fingers to change their positions relative to one other, the focus area 220 may be redefined based on new manual inputs and adjustments to the vectors. In some aspects, this is not a direct 1:1 mapping between finger separation and angle, allowing for gain factors, snapping behaviors, and non-linear transfer functions familiar to those skilled in the art. Similarly, user may rotate their hands, but keep the relative positions of their fingers the same, thus providing new manual inputs to define an angle at which the focus area 220 is "projected" for display on the application canvas from the hand. The relative positions of the fingers may be determined based on the identification of the orientation of fingerprints. In addition, depth sensing (cameras) may sense a wearable device, the user's wrist, the articulation of the forearm, and overall relative body orientation, to help refine the projection of the framing-region from the fingertips.

In response to determining that a touch input has been received, but that it was received in open space (rather than in association with an object or control), that touch input may be treated as a focus area 220 defining gesture, and method 700 returns to OPERATION 730 to adjust how the focus area 220 is defined. In some aspects, this is interpreted as a direct-manipulation of the edges and outer arc defining the focus area 220. In other aspects, for example, a user may make a swipe gesture to change a shape or curvature of the arc, the given distance at which the arc is defined from the manual inputs, or a vector behavior. In another aspect, that touch input may be treated as a global gesture to affect all the objects within the focus area 220. For example, a user inputting a "pinch/expand" gesture may enlarge or shrink the size of all objects within the focus area 220. Other space behaviors are possible, and those above are given as non-limiting examples. Note that gestures that are within, proximal to, or in various zones adjacent to the focus area 220 may be given different interpretations.

In response to determining that a touch input has been received, and that it was received in association with an object(s) or control, method 700 proceeds to OPERATION 770, where that object or control is selected. Selecting an object(s) results in object-related controls being displayed in the focus area 220, and selecting a control results in an interaction being performed on one or more objects. Method 700 may then end, or continue displaying the focus area 220. Note that the controls offered may depend on the type of objects in the selection (including selections of mixed object types, or 'empty' selections that indicate an area but otherwise contain no objects). Universal operations common to all object types can also be hosted within the same framework (such as those provided on the aforementioned 'actions' menu).

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
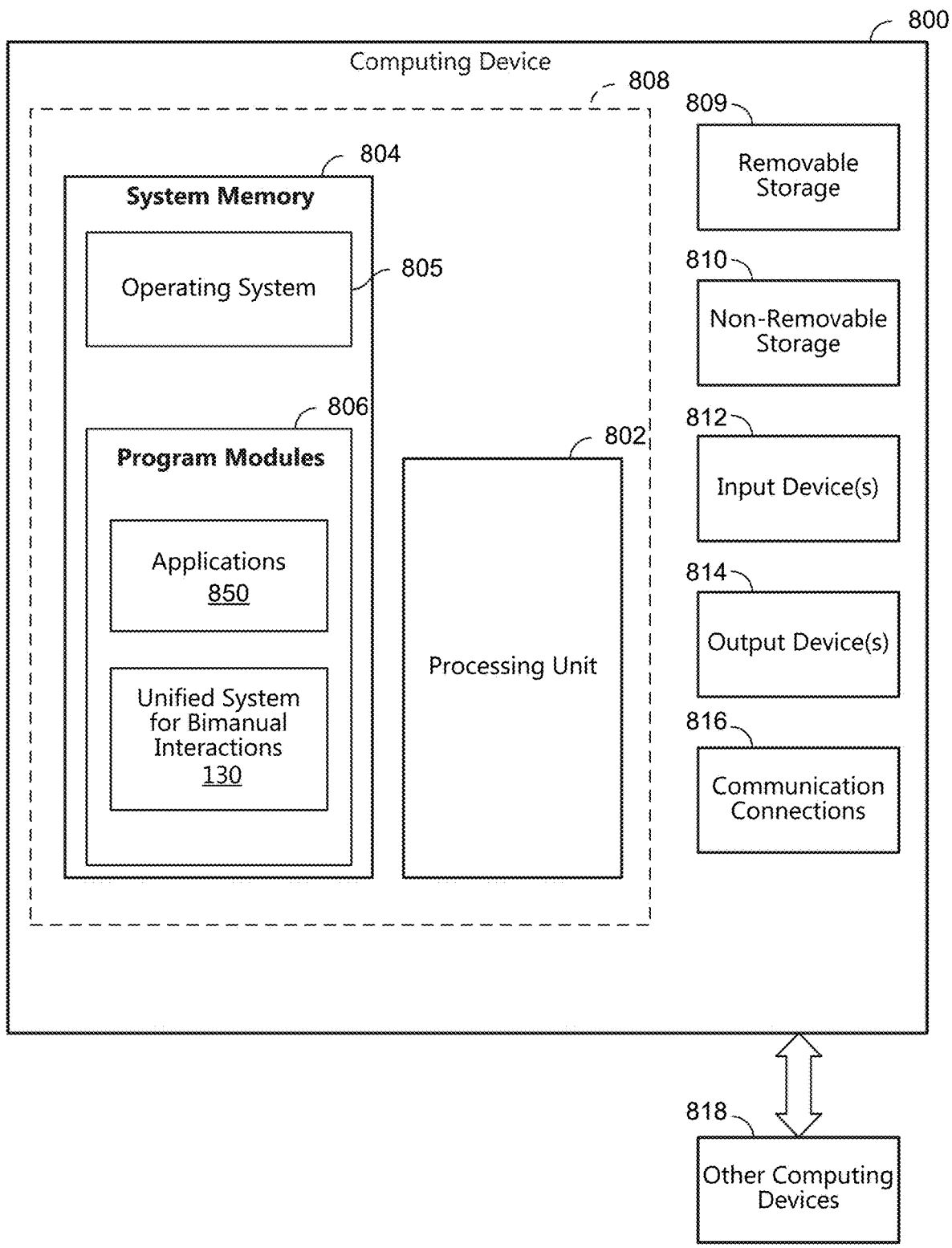
FIG. 8 is a block diagram illustrating example physical components of a computing device.
Figure 9A:
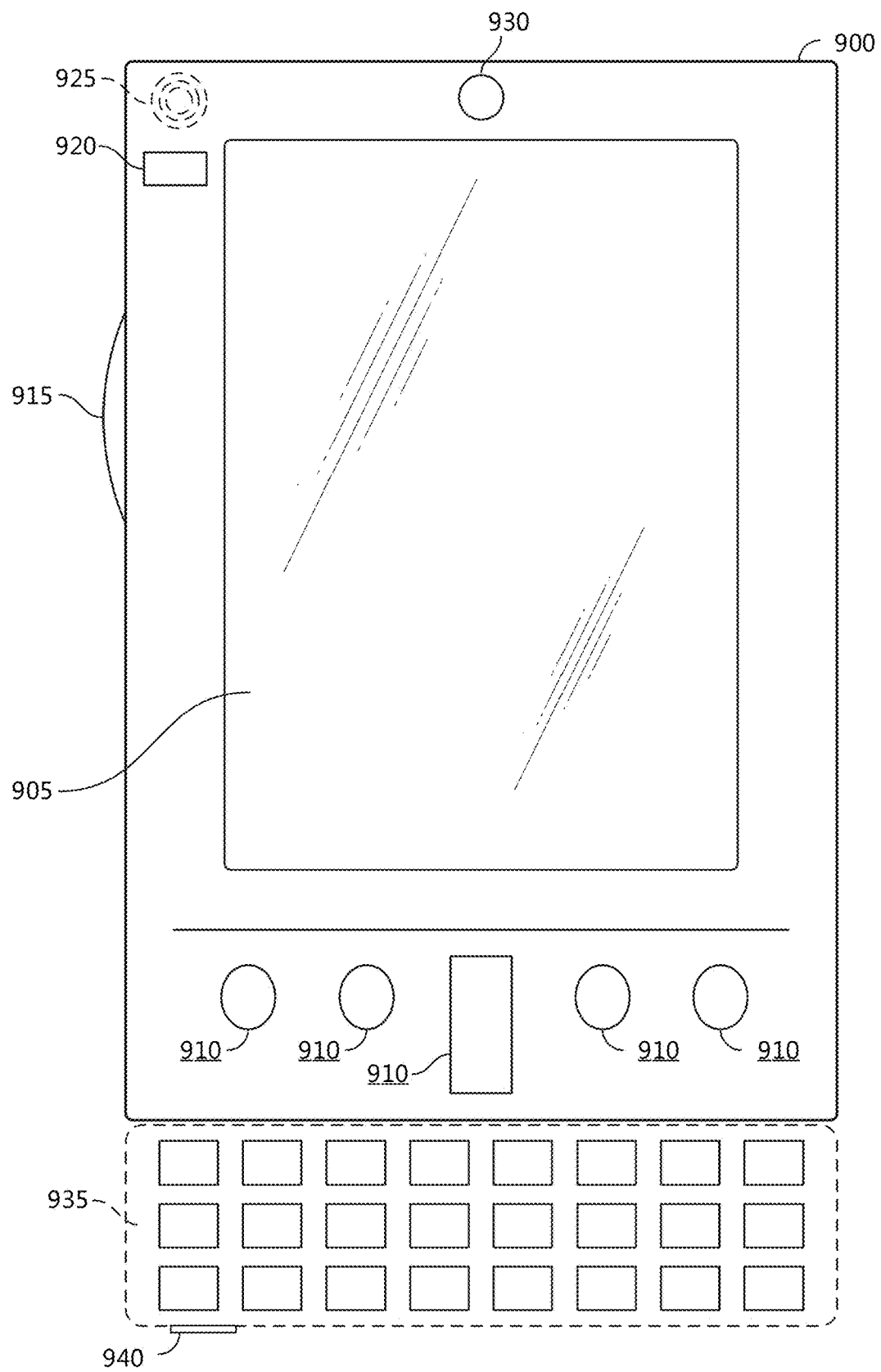
FIGS. 9A and 9B are block diagrams of a mobile computing device.
Figure 9B:
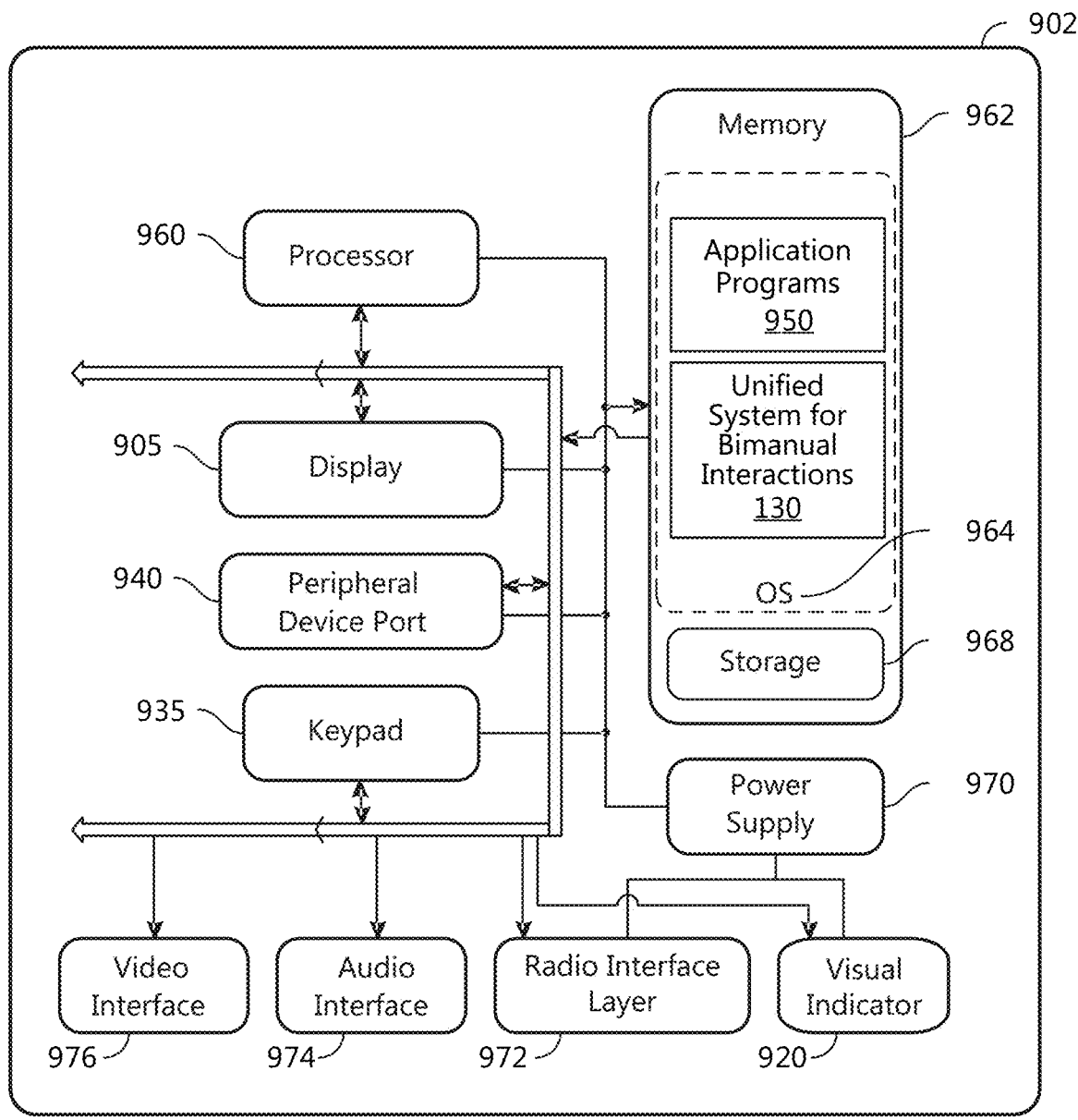
Figure 10:
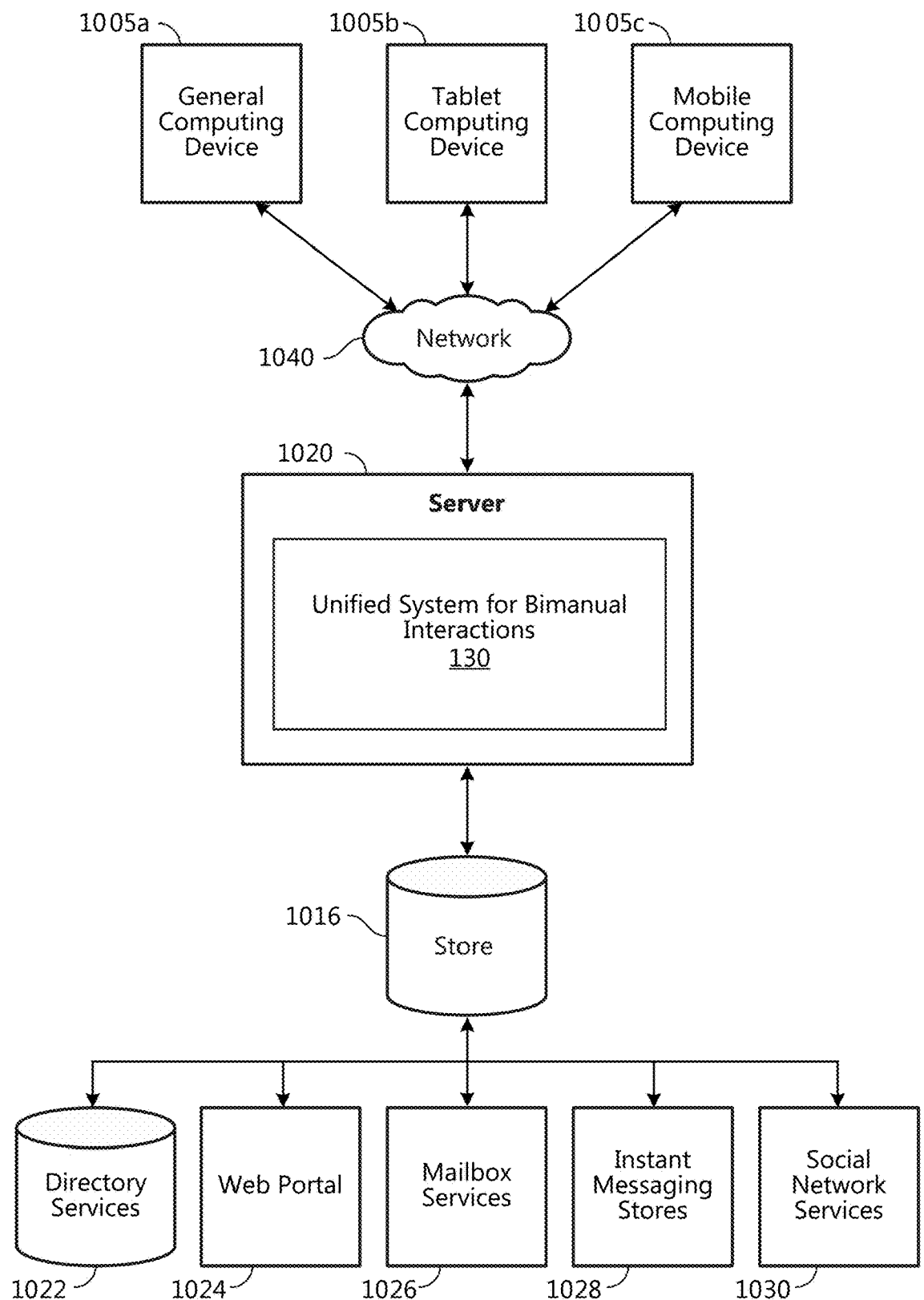
FIG. 10 is a block diagram of a distributed computing system.

FIGS. 8-10 and the associated descriptions provide a discussion of a variety of operating environments in which examples are practiced. However, the devices and systems illustrated and discussed with respect to FIGS. 8-10 are for purposes of example and illustration and are not limiting of a vast number of computing device configurations that are utilized for practicing aspects, described herein.

FIG. 8 is a block diagram illustrating physical components (i.e., hardware) of a computing device 800 with which examples of the present disclosure may be practiced. In a basic configuration, the computing device 800 includes at least one processing unit 802 and a system memory 804. According to an aspect, depending on the configuration and type of computing device, the system memory 804 comprises, but is not limited to, volatile storage (e.g., random access memory), non-volatile storage (e.g., read-only memory), flash memory, or any combination of such memories. According to an aspect, the system memory 804 includes an operating system 805 and one or more program modules 806 suitable for running software applications 850. According to an aspect, the system memory 804 includes unified system for bimanual interactions 130. The operating system 805, for example, is suitable for controlling the operation of the computing device 800. Furthermore, aspects are practiced in conjunction with a graphics library, other operating systems, or any other application program, and are not limited to any particular application or system. This basic configuration is illustrated in FIG. 8 by those components within a dashed line 808. According to an aspect, the computing device 800 has additional features or functionality. For example, according to an aspect, the computing device 800 includes additional data storage devices (removable and/or non-removable) such as, for example, magnetic disks, optical disks, or tape. Such additional storage is illustrated in FIG. 8 by a removable storage device 809 and a non-removable storage device 810.

As stated above, according to an aspect, a number of program modules and data files are stored in the system memory 804. While executing on the processing unit 802, the program modules 806 (e.g., unified system for bimanual interactions 130) perform processes including, but not limited to, one or more of the stages of the method 700 illustrated in FIG. 7. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 8 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 800 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 800 has one or more input device(s) 812 such as a keyboard, a mouse, a pen, a sound input device, a touch input device, etc. The output device(s) 814 such as a display, speakers, a printer, etc. are also included according to an aspect. The aforementioned devices are examples and others may be used. According to an aspect, the computing device 800 includes one or more communication connections 816 allowing communications with other computing devices 818. Examples of suitable communication connections 816 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. According to an aspect, any such computer storage media is part of the computing device 800. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a tablet personal computer, a laptop computer, and the like, with which aspects may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. According to an aspect, the display 905 of the mobile computing device 900 functions as an input device (e.g., a touch screen display). If included, an optional side input element 915 allows further user input. According to an aspect, the side input element 915 is a rotary switch, a button, or any other type of manual input element. In alternative examples, mobile computing device 900 incorporates more or fewer input elements. For example, the display 905 may not be a touch screen in some examples. In alternative examples, the mobile computing device 900 is a portable phone system, such as a cellular phone. According to an aspect, the mobile computing device 900 includes an optional keypad 935. According to an aspect, the optional keypad 935 is a physical keypad. According to another aspect, the optional keypad 935 is a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 900 incorporates peripheral device port 940, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 incorporates a system (i.e., an architecture) 902 to implement some examples. In one example, the system 902 is implemented as a "smart phone" capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone.

According to an aspect, one or more application programs 950 are loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. According to an aspect, unified system for bimanual interactions 130 is loaded into memory 962. The system 902 also includes a non-volatile storage area 968 within the memory 962. The non-volatile storage area 968 is used to store persistent information that should not be lost if the system 902 is powered down. The application programs 950 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

According to an aspect, the system 902 has a power supply 970, which is implemented as one or more batteries. According to an aspect, the power supply 970 further includes an external power source, such as an AC adapter or a powered docking cradle that supplements or recharges the batteries.

According to an aspect, the system 902 includes a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

According to an aspect, the visual indicator 920 is used to provide visual notifications and/or an audio interface 974 is used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. According to an aspect, the system 902 further includes a video interface 976 that enables an operation of an on-board camera 930 to record still images, video stream, and the like.

According to an aspect, a mobile computing device 900 implementing the system 902 has additional features or functionality. For example, the mobile computing device 900 includes additional data storage devices (removable and/or non-removable) such as, magnetic disks, optical disks, or tape. Such additional storage is illustrated in FIG. 9B by the non-volatile storage area 968.

According to an aspect, data/information generated or captured by the mobile computing device 900 and stored via the system 902 are stored locally on the mobile computing device 900, as described above. According to another aspect, the data are stored on any number of storage media that are accessible by the device via the radio 972 or via a wired connection between the mobile computing device 900 and a separate computing device associated with the mobile computing device 900, for example, a server computer in a distributed computing network, such as the Internet. As should be appreciated such data/information are accessible via the mobile computing device 900 via the radio 972 or via a distributed computing network. Similarly, according to an aspect, such data/information are readily transferred between computing devices for storage and use according to well-known data/information transfer and storage means, including electronic mail and collaborative data/information sharing systems.

FIG. 10 illustrates one example of the architecture of a system for providing a unified system for bimanual interactions as described above. Content developed, interacted with, or edited in association with the unified system for bimanual interactions 130 is enabled to be stored in different communication channels or other storage types. For example, various documents may be stored using a directory service 1022, a web portal 1024, a mailbox service 1026, an instant messaging store 1028, or a social networking site 1030. The unified system for bimanual interactions 130 is operative to use any of these types of systems or the like for providing a unified system for bimanual interactions, as described herein. According to an aspect, a server 1020 provides the unified system for bimanual interactions 130 to clients 1005a,b,c. As one example, the server 1020 is a web server providing the unified system for bimanual interactions 130 over the web. The server 1020 provides the unified system for bimanual interactions 130 over the web to clients 1005 through a network 1040. By way of example, the client computing device is implemented and embodied in a personal computer 1005a, a tablet computing device 1005b or a mobile computing device 1005c (e.g., a smart phone), or other computing device. Any of these examples of the client computing device are operable to obtain content from the store 1016.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for providing a unified system for bimanual interactions, comprising:
receiving, in an application canvas of an application displayed on a touchscreen of a computing device that is executing the application, an interaction at a location in the application canvas, the interaction comprising a first manual input and a second manual input to the touchscreen by a user;
determining, without further user input, that the interaction is a framing interaction based on a determination that the first manual input and the second manual input to the touchscreen are provided by a non-dominant hand of the user and the interaction is held for a predetermined period of time; and
in response to determining the interaction is the framing interaction:
defining a focus area extending away from the location in the application canvas; and
displaying the focus area in the application canvas while receiving the interaction.

2. The method of claim 1, further comprising highlighting objects displayed in the application canvas within the focus area.

3. The method of claim 2, further comprising displaying, in the application canvas, selectable object controls associated with the highlighted objects.

4. The method of claim 1, further comprising:
receiving, in the application canvas, an updated position of the second manual input relative to the first manual input; and
in response to receiving motion dynamics that are indicative of zooming, ceasing display of the focus area.

5. The method of claim 1, further comprising:
receiving, in the application canvas, an updated location of the interaction; and
adjusting the focus area displayed in the application canvas relative to the updated location.

6. The method of claim 1, further comprising:
displaying the focus area in the application canvas according to one or more of a given distance and orientation.

7. The method of claim 1, wherein in response to determining that the first manual input and the second manual input are provided by a dominant hand of the user, applying the first manual input and the second manual input as a multi-touch input.

8. The method of claim 1, further comprising:
receiving a touch input within the focus area, the touch input defining a swipe;
adjusting a given distance defining an arc according to the swipe, thereby redefining the focus area; and
displaying the redefined focus area.

9. The method of claim 1, wherein the focus area is displayed as a transparent overlay in the application canvas.

10. A system for providing unified system for bimanual interactions, comprising:
a processing unit; and
a memory including instructions, which when executed by the processing unit, causes the system to:
receive, in an application canvas of an application displayed on a touchscreen of a computing device that is executing the application, a first manual input to the touchscreen by a user;
receive, in the application canvas, a second manual input to the touchscreen by the user, wherein the first manual input and the second manual input comprise an interaction;
determine, without further user input, that the interaction is a framing interaction based on a determination that the first manual input and the second manual input to the touchscreen are provided by a non-dominant hand of the user and the interaction is held for a predetermined period of time; and
in response to determining that the interaction is the framing interaction:
extend a first vector and a second vector away from the non-dominant hand based on the first manual input and the second manual input;
define an arc between the first vector and the second vector at a given distance from the first manual input on the first vector and the given distance from the second manual input on the second vector, wherein the arc, the first vector, and the second vector define a focus area; and display the focus area in the application canvas.

11. The system of claim 10, wherein the processing unit further causes the system to highlight objects displayed in the application canvas within the focus area.

12. The system of claim 11, wherein the processing unit further causes the system to display, in the application canvas, selectable object controls associated with the highlighted objects.

13. The system of claim 10, wherein the processing unit further causes the system to:

receive, in the application canvas, an updated position of the second manual input relative to the first manual input; and in response to receipt of the updated position:

cease display of the focus area;

re-extend the second vector away from the non-dominant hand based on the first manual input and the second manual input;

redefine the arc between the first vector and the second vector according to the given distance, thereby redefining the focus area; and display the redefined focus area in the application canvas.

14. The system of claim 10, wherein the processing unit further causes the system to:

receive, in the application canvas, updated positions of the first manual input and the second manual input, wherein the first manual input retains a relative position to the second manual input; and in response to receiving the updated positions, adjust an angle at which the focus area is displayed in the application canvas relative to the non-dominant hand.

15. The system of claim 10, wherein the processing unit further causes the system to:

display the first vector and the second vector in the application canvas according to the given distance.

16. The system of claim 10, wherein the processing unit further causes the system to apply the first manual input and the second manual input as a multi-touch input in response to determining that the first manual input and the second manual input are provided by a dominant hand of the user.

17. The system of claim 10, wherein the processing unit further causes the system to:

receive a touch input within the focus area, the touch input defining a swipe;

adjust the given distance defining the arc according to the swipe, thereby redefining the focus area; and display the redefined focus area.

18. A computer readable storage medium including computer readable instructions, which when executed by a processing unit, performs steps for providing a unified system for bimanual interactions, comprising:

receiving, in an application canvas of an application displayed on a touchscreen of a computing device that is executing the application, a first manual input to the touchscreen by a user;

receiving, in the application canvas, a second manual input to the touchscreen by the user, wherein the first manual input and the second manual input comprise an interaction;

determining, without further user input, that the interaction is a framing interaction based on a determination that the first manual input and the second manual input to the touchscreen are provided by a non-dominant hand of the user and the interaction is held for a predetermined period of time; and in response to determining that the interaction is the framing interaction:

extending a first vector and a second vector away from the non-dominant hand based on the first manual input and the second manual input;

defining an arc between the first vector and the second vector at a given distance from the first manual input on the first vector and the given distance from the second manual input on the second vector, wherein the arc, the first vector, and the second vector define a focus area; and displaying the focus area in the application canvas.

19. The method of claim 1, wherein determining the interaction is the framing interaction further comprises:

determining the first manual input is associated with a thumb of the non-dominant hand of the user and the second manual input is associated with a forefinger of the non-dominant hand of the user.

20. The method of claim 19, wherein defining the focus area extending away from the location in the application canvas comprises:

defining the focus area between a first vector extending away from the thumb at a given distance and a second vector.

* * * * *